United States Patent
Milot

(10) Patent No.: US 7,292,924 B2
(45) Date of Patent: Nov. 6, 2007

(54) VEHICLE STABILITY CONTROL ENHANCEMENT USING TIRE FORCE CHARACTERISTICS

(75) Inventor: Danny R. Milot, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 322 days.

(21) Appl. No.: 10/978,915

(22) Filed: Nov. 1, 2004

(65) Prior Publication Data

US 2005/0080546 A1    Apr. 14, 2005

Related U.S. Application Data

(63) Continuation of application No. PCT/US03/13290, filed on May 1, 2003.

(60) Provisional application No. 60/376,753, filed on May 1, 2002, now abandoned.

(51) Int. Cl.
*G06F 7/70* (2006.01)

(52) U.S. Cl. .............. 701/70; 701/75; 701/36; 701/91

(58) Field of Classification Search .......... 701/33, 701/36, 48, 38, 70, 71, 74, 75, 78, 82, 83, 701/91
See application file for complete search history.

(56) References Cited

U.S. PATENT DOCUMENTS

| | | | |
|---|---|---|---|
| 4,876,528 A | 10/1989 | Walker et al. | |
| 5,591,906 A | 1/1997 | Okawa et al. | |
| 5,721,374 A | 2/1998 | Siekkinen et al. | |
| 5,979,995 A | 11/1999 | Miyazaki | |
| 6,121,895 A | 9/2000 | Beeson | |
| 6,122,585 A | 9/2000 | Ono et al. | |
| 6,161,431 A | 12/2000 | Drähne et al. | |
| 6,183,010 B1 | 2/2001 | Daoud | |
| 6,212,464 B1 | 4/2001 | Skotnikov | |
| 6,219,604 B1 | 4/2001 | Dilger et al. | |

(Continued)

FOREIGN PATENT DOCUMENTS

CN    1341519    3/2002

(Continued)

OTHER PUBLICATIONS

English language Abstract of CN 1341519.

*Primary Examiner*—Richard M. Camby
(74) *Attorney, Agent, or Firm*—MacMillan, Sobanski & Todd, LLC

(57) ABSTRACT

A method of controlling an advanced chassis control system of a vehicle such as an anti-lock brake system, traction control system, vehicle stability control system, or roll control system affecting the vehicle dynamic performance and safety is disclosed. A control unit controls the operation of the advanced chassis control system based at least in part upon predictions of force generating characteristics of tires of the vehicle and driver input signals. The advanced chassis control system of the vehicle is controlled in one manner if the tire is determined to be inflated, controlled in another, different manner if the tire is determined to be deflated. During normal driving, the chassis control systems can operate to control the vehicle according to the desires of the driver while accounting for at least one tire being deflated. During braking the controller can act to distribute braking forces in order to divert forces from the deflated tire to the inflated tires.

12 Claims, 2 Drawing Sheets

U.S. PATENT DOCUMENTS

| | | |
|---|---|---|
| 6,250,421 B1 | 6/2001 | Poshadlo |
| 6,259,361 B1 | 7/2001 | Robillard et al. |
| 6,272,418 B1 * | 8/2001 | Shinmura et al. ............. 701/72 |
| 6,278,361 B1 | 8/2001 | Magiawala et al. |
| 6,281,787 B1 | 8/2001 | Lerg et al. |
| 6,285,280 B1 | 9/2001 | Wang |
| 6,330,496 B1 | 12/2001 | Latarnik et al. |
| 6,343,249 B1 * | 1/2002 | Sakai et al. ................... 701/48 |
| 6,622,074 B1 * | 9/2003 | Coelingh et al. ............. 701/48 |
| 6,873,891 B2 | 3/2005 | Moser et al. |
| 2001/0025679 A1 | 10/2001 | Dufournier et al. |
| 2002/0032513 A1 | 3/2002 | Faye |
| 2003/0058118 A1 | 3/2003 | Wilson |

FOREIGN PATENT DOCUMENTS

| | | |
|---|---|---|
| DE | 197 44 725 | 4/1999 |
| EP | 1 291 230 | 3/2003 |
| JP | 2-241864 | 9/1990 |
| JP | 7-205830 | 8/1995 |
| JP | 7-257349 | 10/1995 |
| JP | 9-99723 | 4/1997 |
| WO | 90/05646 | 5/1990 |
| WO | 01/08908 | 2/2001 |
| WO | 01/89898 | 11/2001 |
| WO | 02/057099 | 7/2002 |

* cited by examiner

VEHICLE STABILITY CONTROL ENHANCEMENT USING TIRE FORCE CHARACTERISTICS

CROSS REFERENCE TO RELATED APPLICATIONS

This application is a continuation of co-pending International Patent Application No. PCT/US03/13290, filed May 1, 2003, claiming priority to U.S. Provisional Patent Application No. 60/376,753 filed May 1, 2002 (now abandoned). International Patent Application PCT/US03/13290 was published as WO03/093081 on Nov. 13, 2003 under PCT Article 21(2). The disclosures of both applications are incorporated herein in their entirety by reference.

BACKGROUND OF THE INVENTION

This invention relates in general to vehicle electronically controlled chassis systems. More particularly the invention relates to chassis systems having anti-lock brakes, traction control, rear wheel steer, etc., and uses tire force characteristics in that system to enhance the overall performance. Many vehicles today come equipped with advanced chassis systems such as anti-lock brake systems, traction control, vehicle stability control and other electronically operated systems that enhance vehicle performance as a function of road conditions. As a part of many of these advanced chassis systems, tire sensors are incorporated on the vehicle tires to obtain information about the interaction between the tires and the road surface that is in turn processed by a controller to regulate the tire forces by selectively maintaining, increasing, or decreasing brake or drive torque and/or slip angle at the associated tire. It is known to use wheel rotational speed or force sensors to obtain the data necessary for the operation of the control system.

For example in U.S. Pat. No. 6,330,496 to Latarnik et al., a method of adjusting the driving performance of a vehicle based on data obtained from tire sensors is disclosed. Particularly, Latarnik et al. discloses using nominal forces acting on the tires as the control quantity which is used by a controller to regulate the brake pressure or engine drive torque. The nominal forces can be converted into brake pressure variations, absolute brake pressures, valve actuation periods or current intensities, or can be used to vary the engine drive torque to control the driven tires. However, the forces sensed on the tires in the Latarnik et al. method are actual forces and torques, and are taken in longitudinal, transverse and vertical directions. Additional inputs for determining nominal quantities can be individual wheel rotational speeds or a vehicle reference speed, for example.

U.S. Pat. No. 5,247,831 to Fioravanti also discloses a method for optimizing the behavior of a vehicle based on estimating the tire footprint. Specifically, the signals monitored to establish footprint behavior are the dynamics of the center of gravity of the vehicle, rotation of the wheels in the vertical plane (driving and braking forces), rotation of the wheels in the horizontal place (steering angle), and vertical movement of the wheels. A processor calculates the footprint of each wheel and processes the data based on control parameters to control various transmission, braking, steering, and suspension members of the vehicle to optimize the performance and safety capabilities of the vehicle. This process can be done continuously to check the driving conditions and optimize the operations of a vehicle.

Additionally, it is known how to detect whether a vehicle has one or more tires having low air pressure or a flat. This information can be transmitted to the driver so that the driver can take remedial measures. For example, in U.S. Pat. No. 5,721,374 to Siekinen et al., detecting low tire pressure is accomplished by comparing wheel speeds using sensors in place on the wheels or within the braking system. U.S. Pat. No. 5,591,906 to Okawa et al. discloses a tire pressure drop detecting device to be used in conjunction with a run-flat tire. Generally, a run-flat tire is designed to operate under a "flat-tire" event, albeit at reduced speeds and for a limited distance. Under such operation, Okawa contemplates a mechanism to detect such a pressure drop and notify the driver, so that the speed and distance limitations of the run-flat tire are not exceeded and safety is enhanced.

While the above-described systems and other existing systems have effectively managed the operation of vehicle control systems, there is a need for greater overall control of a vehicle using tire sensors to detect tire conditions and operate a control system based on the sensed data.

SUMMARY OF THE INVENTION

This invention relates to a method of controlling an advanced chassis control system of a vehicle such as an anti-lock brake system, traction control system, rear wheel steering system, vehicle stability control system, roll control system or other system affecting the vehicle dynamic performance or overall safety. An Electronic Control Unit (ECU) controls the operation of the advanced chassis control system based at least in part upon predictions of force generation characteristics of vehicle tires. The advanced chassis control system of the vehicle is controlled in one manner if the tire is determined to be inflated, controlled in another, different manner if the tire is determined to be deflated.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

This invention relates to an algorithm that enhances vehicle stability control through the use of known tire force characteristics. Particularly, the vehicle stability control systems that the algorithm can operate with are anti-lock brake systems (ABS), traction control systems, yaw stability control systems, rear-wheel steer systems, active front steer systems, two-channel active roll control (ARC). The tire force characteristics are received through estimation based on tire pressure and temperature sensors or through indirect measurement. Generally, a vehicle stability control (VSC) system does not have any knowledge of actual tire characteristics. Therefore, with the addition of tire force information, the vehicle state estimations can be improved, hence providing more accurate information to the vehicle stability control algorithm.

One application of this invention is with respect to extended mobility tire technology (such as run-flat tires)

where tire pressure is monitored to identify a deflation condition. In a deflated tire state, the tire technology is such that the tire still has the ability to function, even though the operating range is limited. It will be appreciated that the present invention can be practiced with any vehicle tire system. It has been identified that the handling and stability characteristics of a vehicle can change significantly when an extended mobility tire has deflated or is in a reduced inflation state. Given known tire characteristics for both inflated and deflated tire situations, the vehicle stability control system can change its mode of operation to enhance safety by detecting when a tire has partially or completely deflated. This system can also be used to adapt the vehicle stability control system when more than one tire has reduced air pressure or is deflated. As the handling and stability of a vehicle changes significantly when one or more tires are deflated, operating the vehicle stability controls based on inflated tire standards can have a negative impact on the safe handling of the vehicle. Additionally, a deflated tire may send signals to a controller indicating that it is operating differently than the normally inflated tires. This could result in the VSC system falsely actuating to correct for excess vehicle yaw, excessive tire slippage, or other conditions when the tire is actually under-inflated or deflated. Therefore, the monitoring of tire pressure and tire forces can prevent a false activation of the vehicle stability controls based on tire deflation.

Figure 1:
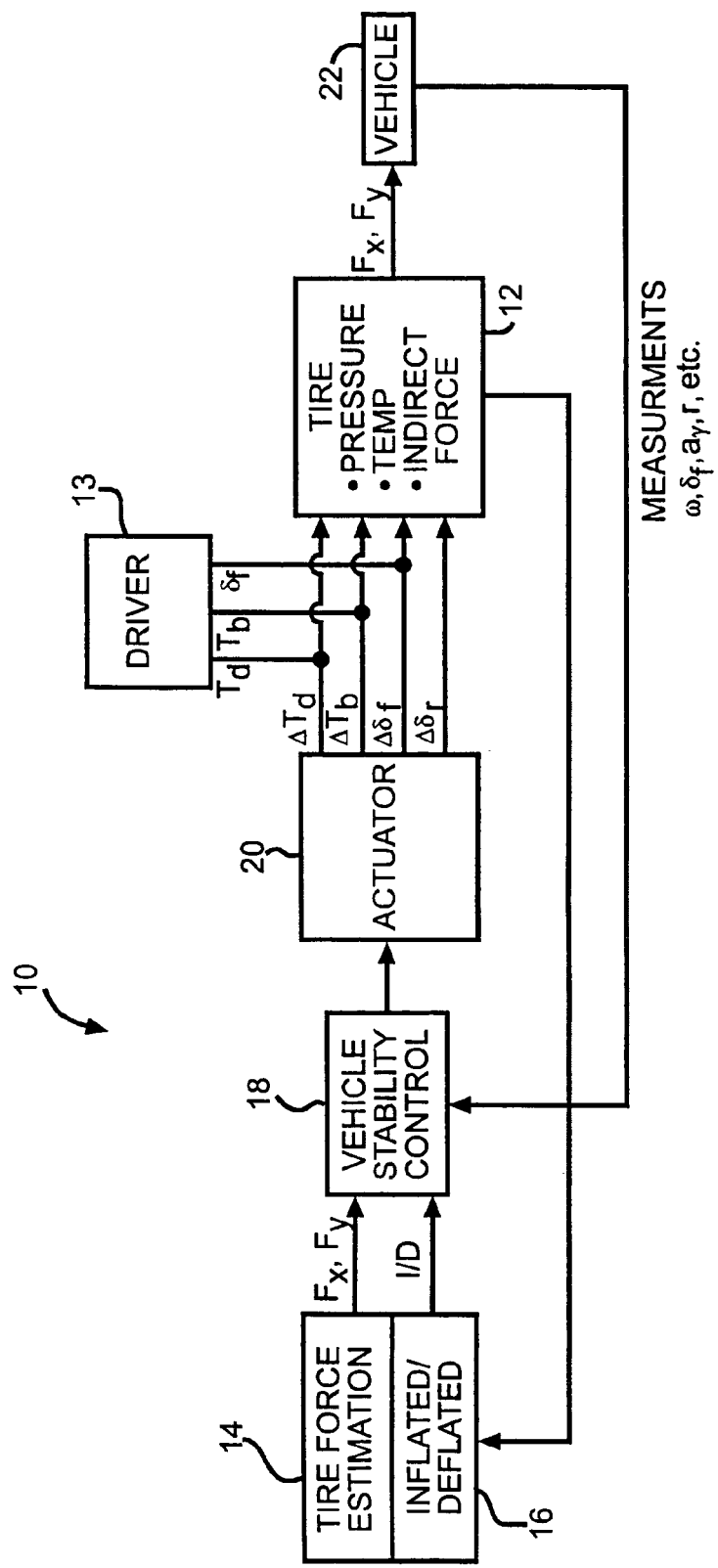
FIG. 1 is a block diagram illustrating the general information flow between sensing, algorithm and control components.

Referring now to the drawings, there is illustrated in FIG. 1 a block diagram of the signal flow in a vehicle stability control system indicated generally at 10. Initially, signals are input from a driver 13 of the vehicle 22. At a minimum, the driver 13 can control the applied brake torque, $T_b$, drive torque, $T_d$ and front wheel steering angle, $\delta_f$ (for a front wheel drive vehicle). It can be appreciated that a driver may be able to control the rear wheel steering angle (in a rear wheel drive vehicle), or other vehicle control inputs. These input signals are then applied to the tires. The vehicle 22 subsequently responds based on the inputs applied to the tires. The driver inputs are sensed by sensors 12 positioned on or about a wheel (not shown). The sensors 12 can also be used to detect the air pressure of a tire mounted on the wheel, tire temperature, and the indirect force being applied to the tire. The information gathered from the sensors 12 is then fed back to an estimator 14 (see also element A in FIG. 2) to obtain an estimated tire force in both the longitudinal and lateral directions, $F_x$ and $F_y$, respectively. The sensed data is also used by an inflated/deflated (I/D) logical indicator 16 to determine whether the tires are in an inflated or deflated state. It should be appreciated that the sensors 12 and the estimators 14, 16 can also be used to determine whether the tires are in an intermediate state between full inflation and full deflation.

The estimated forces and inflated/deflated (I/D) state information are then transmitted to the vehicle stability control (VSC) processor 18. Additionally, a signal from the vehicle 22 is fed back to the VSC processor based on the actual response of the vehicle 22 to the input from the driver 13 on the tires. The VSC processor 18 outputs a signal to the actuator 20 based on the sensed tire data and actual vehicle response. The VSC processor can, therefore, determine whether the vehicle 22 is properly responding to the driver inputs. If the vehicle 22 is not responding as directed by the driver, the processor can output an active correction signal to the actuator to supplement the driver inputs so as to cause the vehicle 22 to perform in the desired manner. Specifically, the actuator 20 preferably outputs an active correction signal for the steering angles for the front and rear tires, $\delta_f$, $\delta_r$, as well as the brake torque, $T_b$ and drive torque, $T_d$. Generally, if the tire is in a slip condition during driving, acceleration, or turning, a VSC system can respond to control the slip condition. The VSC system can use a throttle control to reduce the drive torque, $T_d$ applied through the engine and transmitted to the tires. Alternatively, brake torque, $T_b$ could be decreased to the tire in order to reduce the slipping of the tire relative to the driving surface. The actuator 20 outputs these signals to augment the driver input signals (except the rear steering angle correction for a front wheel drive vehicle wherein the correction is not supplemented by a driver input). The correction signals combined with the driver inputs are applied to the tires which in turn control the vehicle 22.

To obtain additional feedback, and therefore enhanced control, a tire rotational speed measurement, $\omega$, front steering angle, $\delta_f$, rear steering angle, $\delta_r$, lateral acceleration, $a_y$, vehicle yaw rate, r, etc. are also measured and communicated to the vehicle stability control processor 18 from the vehicle 22. This is in conjunction with the brake torque, $T_b$, and drive torque, $T_d$, which are also fed back to the VSC 18 and factored in therewith to provide a continuously integrated signal based on the forces being applied to the tire(s).

Figure 2:
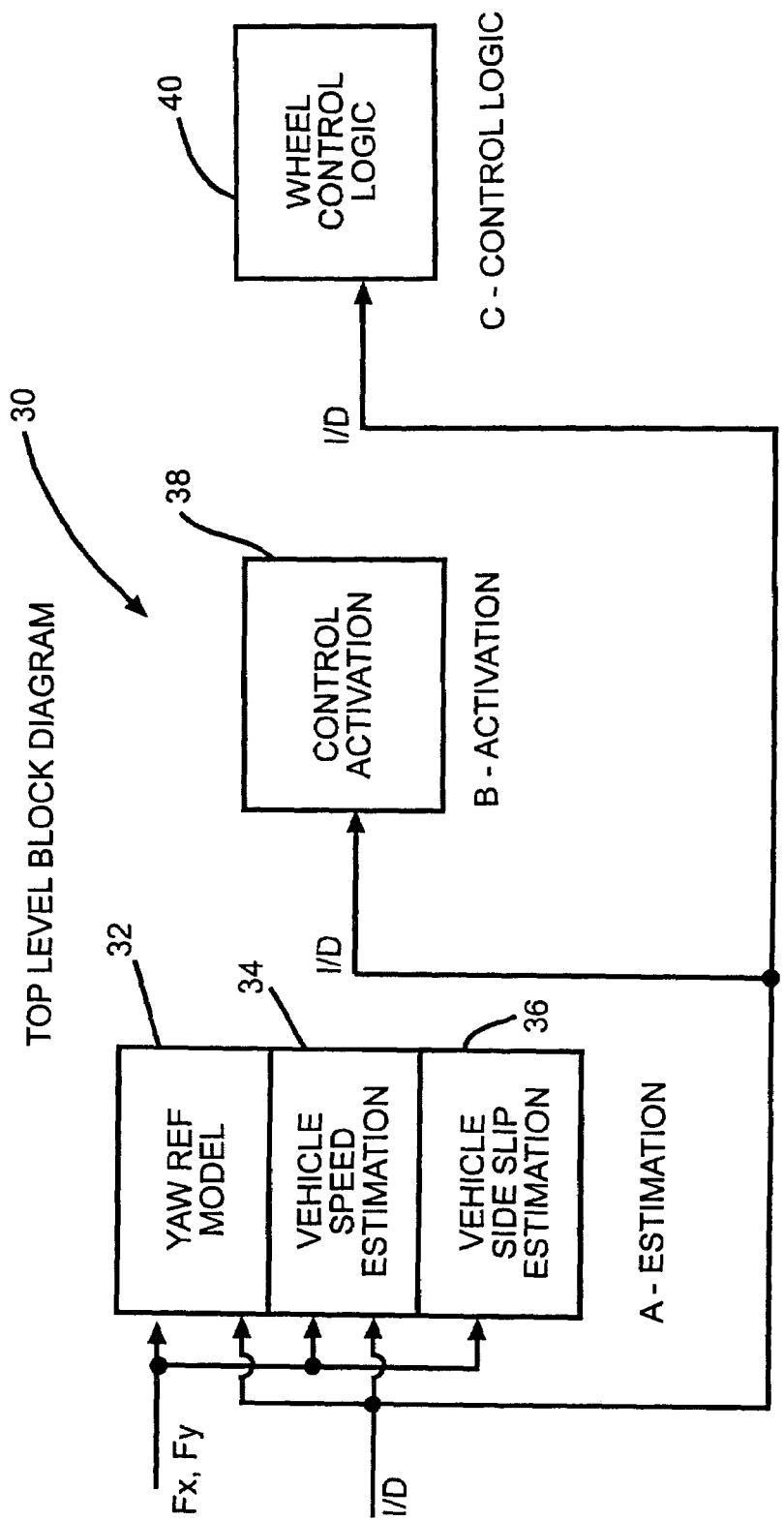
FIG. 2 is a top level block diagram illustrating phases of data processing used in the present invention.

Illustrated in FIG. 2 is a top level block diagram 30 showing the phases of data processing used in the present invention. The estimation phase is represented by an element "A". First, the Yaw Reference Model 32 is used to determine the desired yaw rate of the vehicle based on the drivers input of front steering angle and estimated vehicle speed. Also estimated are the Vehicle Speed 34 and Vehicle Side Slip 36 based on real time force characteristics. In conventional vehicle stability control systems, tire force characteristics are generally assumed to be an unknown factor. $F_x$ and $F_y$ are therefore used in the present invention to enhance the accuracy of the various estimations shown so that the adaptive measures normally used are not relied on so heavily. Generally, adaptive measures commonly used are based on limited information based on the available sensing mechanisms. Due to these limitations, there are assumptions that have to be made as to the nominal characteristics of the vehicle. For example as with a yaw reference model, such assumptions are based on new vehicle characteristics and do not account for changes in the vehicle as it ages, nor does it account for wear on the tires. Therefore, vehicle control mechanisms need to be adapted over the life of the vehicle. With respect to vehicle speed estimation, the model must account for dynamic rolling radius changes and other factors. While certain adaptive measures have been adequate in the past, a more accurate method would be beneficial. Therefore, if some form of actual tire force measurement or estimation is available, as with the system shown, then other vehicle states can be estimated with a higher degree of accuracy than models based on assumed or adapted values.

The inflated/deflated (I/D) logical indicator 16 is used to enhance estimation when discrete changes in the tire characteristics occur. Particularly, the data from the sensors 12 as well as the estimated tire force in the longitudinal and lateral directions, $F_x$ and $F_y$, are used to determine whether a given tire is operating in an inflated or deflated state. Monitoring the discrete changes in tire characteristics allows the control system 18 to ensure that inappropriate actuation commands are not initiated thereby causing vehicle instability due to an inappropriate actuation.

Particularly, it may be beneficial to not actuate a vehicle brake for a normally inflated tire (e.g. right front tire) when a deflated tire (e.g. right left tire) is on the same axle. Applying the fully demanded amount of braking to the inflated tire when the opposing tire on the same axle is deflated could cause an excessive amount of yaw on the vehicle causing the driver to lose control, i.e. vehicle instability. Thus, the control system 10 of the present invention can control the vehicle brakes in a manner that accounts for potentially disparate forces acting on opposing tires on a given axle. The desired brake forces could be redirected to the other vehicle brakes in order to achieve the desired amount of braking. Although this aspect of the invention has been described as controlling the braking applied to a given tire and an opposing tire on the same axle, it can be appreciated that a control of yaw may be achieved by braking other combinations of tires and controlling steering (e.g. rear wheel steering). The combination pattern of limited and full braking could vary depending on the vehicle load, whether the vehicle is front or rear wheel drive, or any other vehicle design setup.

Control Activation 38 occurs during the second indicated phase "B". The I/D logical indicator 16 is used to make the activation criteria for the VSC system 18 more sensitive when a deflated tire condition is recognized. This enhances performance because the vehicle dynamic stability properties of the vehicle 22 are generally more sensitive in yaw stability due to the deflated state of a tire.

Finally, in phase "C", the Tire Control Logic 40 is actuated. The I/D logical indicator 16 is used to determine the correct tire to use for control. If a tire that would normally be selected is deflated, then an alternate mechanism for control must be employed. Also, knowledge of which tire or tires are deflated can be used to deflect actuation from the specific tire during braking so that the deflated tire or tires are not asked to perform a function they are not capable of fulfilling.

According to another aspect of the invention, when there is a rapid decrease in tire pressure, such as when there is a tire "blow-out", the control system operates to further maintain vehicle stability. It is contemplated that an ABS system could be used to restrict or control brake pressure delivered to a vehicle wheel or axle that has a deflated tire based on information received from tire pressure sensors. Any suitable means to detect a rapid deflation or deflation condition can be used. Particularly, the sensors 12 described above could be used, or additionally, noise or vibration sensors, or strain gauges within tire could detect the deflation state of a tire.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle stability control system comprising:
   a vehicle sensor indicating a dynamic condition of a vehicle;
   a tire sensor indicating a condition of a tire;
   an actuator for a vehicle system that controls at least one of drive torque, brake torque and steering angle; and
   a control unit that controls the actuator based on the dynamic condition indicated by the vehicle sensor, an inflation state of the tire, and force characteristics of the tire,
   wherein the control unit determines the inflation state of the tire and force characteristics of the tire based upon the tire condition indicated by the tire sensor.

2. The vehicle stability control system of claim 1 wherein the control unit controls the actuator in a first manner based on the tire being in an inflated state and in a second manner based on the tire being in a deflated state.

3. The vehicle stability control system of claim 2 wherein the first manner of control includes controlling the actuator to control one of drive torque and brake torque in dependence upon an input signal to the control unit.

4. The vehicle stability control system of claim 3 wherein the second manner of control includes controlling the actuator to control one of drive torque and brake torque in dependence upon an input signal and at a decreased level as compared to the first manner.

5. The vehicle stability control system of claim 2 wherein the tire sensor is adapted to determine whether at least one tire is in at least one of an inflated and deflated state, and the control unit controls the actuator based on the one of the inflated and deflated state determined.

6. The vehicle stability control system of claim 5 wherein the first manner of control includes the control unit controlling the actuator to one of increase or decrease one of the drive torque and the brake torque based on an input drive torque signal and the inflated and deflated state determined, and the second manner of control includes the other of increase or decrease the one of the drive torque and the brake torque.

7. The vehicle stability control system of claim 1 further comprising at least one vehicle response sensor indicating at least one of tire rotational speed, front tire steering angle, rear tire steering angle, lateral acceleration, and vehicle yaw rate, and wherein the control unit controls the actuator based on a vehicle response indicated by the vehicle response sensor.

8. The vehicle stability control system of claim 1 further comprising;
   a steering angle sensor that indicates a steering angle of the vehicle and wherein the control unit controls the actuator based on the steering angle indicated.

9. The vehicle stability control system of claim 1 wherein the control unit controls the actuator based on an input of a driver.

10. The vehicle stability control system of claim 1 wherein the tire is a run-flat tire.

11. The vehicle stability control system of claim 10 wherein the control unit controls the actuator to limit one of brake torque and drive torque applied to the tire when the tire is in a deflated state, and the control unit controls the actuator to increase the one of drive torque and brake torque on an inflated tire.

12. The vehicle stability control system of claim 1 further comprising:
   a driver input signal detector that indicates the drive torque, brake torque and steering angle commanded by the driver, wherein the control unit controls the actuator based on the driver input indicated.

* * * * *